(12) United States Patent
Mai et al.

(10) Patent No.: US 10,683,048 B2
(45) Date of Patent: Jun. 16, 2020

(54) ELECTRIC BICYCLE, IMMOBILIZER FOR AN ELECTRIC BICYCLE AND METHOD FOR OPERATING AN ELECTRIC BICYCLE

(71) Applicant: CONTI TEMIC MICROELECTRONIC GMBH, Nuremberg (DE)

(72) Inventors: Wolfgang Mai, Kronberg Im Taunus (DE); Wolfgang Ludwig, Butzbach-Maibach (DE); Rainer Hild, Loehnberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/768,392

(22) PCT Filed: Oct. 4, 2016

(86) PCT No.: PCT/EP2016/073687
§ 371 (c)(1),
(2) Date: Apr. 13, 2018

(87) PCT Pub. No.: WO2017/063918
PCT Pub. Date: Apr. 20, 2017

(65) Prior Publication Data
US 2018/0297656 A1 Oct. 18, 2018

(30) Foreign Application Priority Data
Oct. 15, 2015 (DE) .......................... 10 2015 220 084

(51) Int. Cl.
*B62H 5/08* (2006.01)
*B62H 5/00* (2006.01)
(Continued)

(52) U.S. Cl.
CPC ............... *B62H 5/08* (2013.01); *B62H 5/001* (2013.01); *B62H 5/20* (2013.01); *B60R 25/24* (2013.01)

(58) Field of Classification Search
CPC .. B62H 5/08; B62H 5/001; B62H 5/20; B60R 25/24
See application file for complete search history.

(56) References Cited

U.S. PATENT DOCUMENTS

| 8,930,054 B2 | 1/2015 | Garcia |
| 2006/0007003 A1 | 1/2006 | Yamagiwa |

(Continued)

FOREIGN PATENT DOCUMENTS

| DE | 202009014347 U1 | 2/2010 |
| DE | 102012004176 A1 | 9/2013 |

(Continued)

*Primary Examiner* — Nay Tun
(74) *Attorney, Agent, or Firm* — Laurence A. Greenberg; Werner H. Stemer; Ralph E. Locher

(57) ABSTRACT

An electric bicycle has an electric motor and an electric energy store for supplying energy to the electric motor. Accordingly, the bicycle has a first controller coupled to the electric motor and is configured to store a first keycode. The bicycle has a second controller coupled to the energy store and is configured to store a second keycode. The controllers are connected or can be connected to a data transmission system, which is a bus. The first and second controllers are configured such that at least one specified controller of the controllers receives the keycode of the other controller. The specified controller is configured to determine whether its keycode matches the received keycode of the other controller using specified criteria. An immobilizer for an electric bicycle can be formed from these components.

15 Claims, 2 Drawing Sheets

(51) Int. Cl.
*B62H 5/20* (2006.01)
*B60R 25/24* (2013.01)

(56) References Cited

U.S. PATENT DOCUMENTS

| | | | |
|---|---|---|---|
| 2007/0192599 A1* | 8/2007 | Kato | H04L 9/0844 |
| | | | 713/168 |
| 2012/0146429 A1 | 6/2012 | Seol | |
| 2013/0213100 A1* | 8/2013 | Cohen | E05B 47/0611 |
| | | | 70/283.1 |
| 2014/0097672 A1 | 4/2014 | Takemura et al. | |
| 2014/0123483 A1* | 5/2014 | Wilsey | B62M 6/90 |
| | | | 29/825 |
| 2015/0116081 A1 | 4/2015 | Nair | |
| 2016/0016625 A1* | 1/2016 | Williams | B62M 6/55 |
| | | | 280/287 |

FOREIGN PATENT DOCUMENTS

| | | |
|---|---|---|
| DE | 102012217775 A1 | 4/2014 |
| EP | 2801495 A2 | 11/2014 |
| JP | 2001180567 A | 7/2001 |
| JP | 2004350355 A | 12/2004 |
| JP | 2006207191 A | 8/2006 |
| JP | 2007331725 A | 12/2007 |
| JP | 2008260400 A | 10/2008 |
| JP | 2012250552 A | 12/2012 |

* cited by examiner

ELECTRIC BICYCLE, IMMOBILIZER FOR AN ELECTRIC BICYCLE AND METHOD FOR OPERATING AN ELECTRIC BICYCLE

FIELD OF THE ART

The invention relates to an electric bicycle, in particular a pedelec or what is known as an e-bike, comprising an electric motor and an electrical energy store, which is preferably a storage battery, for supplying power to the electric motor.

PRIOR ART

Bicycles are more and more often being equipped with electric auxiliary motors in order to assist the rider during travelling (pedelec). This for the most part involves electric motors being mounted on the bottom bracket or in the axles of the wheels. To store electric power for operating the electric motors, is storage batteries are normally mounted on the down tube or on the luggage rack that normally contain a microcontroller for regulating charging. Sometimes, the handlebars have a unit for is displaying the fill level of the storage battery and for setting the mode of operation that can also be detached and attached, depending on the design. Moreover, electronic control units are used in order to adapt the electric motor as needed and in a manner customised to the rider and to the riding state. A control unit can contain a microcontroller for control and regulation. Such a control unit can be combined with the motor in a drive unit, particularly in the case of drives on the bottom bracket. Electric bicycles, that is to say bicycles having an electric auxiliary motor (pedelecs) and what are known as e-bikes, are enjoying growing popularity. However, electric bicycles have a large number of expensive components that can easily be stolen, such as e.g. the storage battery. This means that electrical bicycles as a whole, but also individual components of them, are particularly at risk of theft. Theft prevention for bicycles is conventionally ensured by an appropriately robust, but also heavy and expensive, lock. The rider has to carry the lock with him separately, however. Depending on the design, it is also possible for mechanical locks to be opened forcefully in a particular time by mechanical action.

Electronic immobilisers are known from automotive engineering. DE 10 2012 217 775 A1 proposes, as an electronic immobiliser for an electric bicycle, an authentication unit for authenticating a user authorised to use the vehicle and for generating an enable signal after successful authentication. DE 10 2012 004 176 A1 discloses an anti-theft system for an is electric bicycle. This comprises a control device that is intended to evaluate signals received via a terminal in order to either enable or disable or block at least one function of is the drive unit on the basis of at least one received signal. The terminal in this case is not configured as part of the control device, but rather is independent of the control device, in particular configured as a mobile terminal that can be carried by the user. Both publications therefore relate to an operator control unit by means of which a control unit/motor unit is enabled.

SUMMARY OF THE INVENTION

Proceeding therefrom, the invention is based on the object of developing an electric bicycle advantageously with a view to theft prevention.

To achieve the object, the invention proposes, according to a first aspect, that the electric bicycle has a first control device that is coupled to the electric motor and that is configured to store a first key code, that the electric bicycle has a second control device that is coupled to the energy store and that is configured to store a second key code, that the control devices are connected or connectable to a data transmission system that is in particular realised by means of a bus, and that the first control device and the second control device are configured such that at least one control device determined among them has the key code of the other control device transmitted to it by the latter, the at least one determined control device being configured to use prescribed criteria to detect whether its key code matches the key code of the other control device that has been transmitted to it. The fact that the first and second control devices are is configured such that at least one control device determined among them has the key code of the other control device transmitted to it by the latter permits various possibilities. One possibility is that only the first control device is intended to get the key code of the other (that is to say the second) control device transmitted to it by the latter. Another possibility is that only the second control device is intended to get the key code of the other (that is to say the first) control device transmitted to it by the latter. A further possibility is that the first control device and the second control device are intended to get the key code of the respective other control device transmitted to them by the latter.

According to a second aspect, the invention proposes achieving the object in that the electric bicycle has a first control device that is coupled to the electric motor and that is configured to store a first key code, in that the electric bicycle has a second control device that is coupled to the energy store and that is configured to store a second key code, in that the electric bicycle comprises a display/operator control unit and a third control device, coupled thereto, that is configured to store a third key code, in that the control devices are connected or connectable to a data transmission system that is in particular realised by means of a bus, and in that the first control device and the second control device and the third control device are configured such that at least one control device determined among them has the respective key code of the other two control devices transmitted to it by the latter, the at least one determined control device being configured to use prescribed criteria to detect whether its key code matches the key codes of the other two control devices that have been transmitted to it. The fact that the first and second and third control devices are configured such that at least one control device determined among them has the respective key code of the other two control devices transmitted to it by the latter permits various possibilities. There is e.g. the possibility that only one of the control devices is intended to get the key code of the other two control devices transmitted to it by the latter. Alternatively, there is e.g. the possibility that two of the three control devices are intended to get the key code of the respective other two control devices transmitted to them by the latter; for example, the first control device could be intended to get the key code of the second and third control devices transmitted to it by the latter and the third control device could be intended to get the key code of the first and second control devices transmitted to it by the latter. Alternatively, there is e.g. the possibility that all the control devices are intended to get the key code of the respective other control devices transmitted to it by the latter.

In the case of the first aspect of the invention, the first control device and the second control device are components of an immobiliser for an electric bicycle, in particular for a pedelec. In the case of the second aspect of the invention, the first control device and the second control device and the third control device are components of an immobiliser for an electric bicycle, in particular for a pedelec. A further part of the immobiliser is preferably formed in each case by a bus system that expediently has a data bus. Further parts of the immobiliser for the electric bicycle may be e.g. an electric motor connected to the first control device and/or an energy store connected to the second control device and/or a display/operator control unit connected to the third control device that can be used e.g. to read off the fill level of the energy store and/or to set particular modes of operation of the electric bicycle. Such an immobiliser can be used for retrofitting to an electric bicycle, for example.

The invention independently relates to an immobiliser for an electric bicycle, in particular for a pedelec or for an e-bike, having: a first control device that is coupled or couplable to an electric motor and that is configured to store a first key code, and a second control device that is coupled or couplable to an energy store for the electric motor and that is configured to store a second key code, wherein the two control devices are connected or connectable to a data transmission system, e.g. to a bus, and wherein the first control device and the second control device are configured such that at least one control device determined among them has the key code of the other control device transmitted to it by the latter, the at least one determined control device being configured to use prescribed criteria to detect whether its key code matches the key code of the other control device that has been transmitted to it.

Moreover, the invention relates to an immobiliser for an electric bicycle, in particular for a pedelec or for an e-bike, having: a first control device that is coupled or couplable to an electric motor and that is configured to store a first key code, a second control device that is couplable or coupled to an energy store, preferably to a storage battery, and that is configured to store a second key code, and a third control device that is couplable or coupled to a display/operator control unit for an electric bicycle and that is configured to store a third key code, wherein the control devices are connectable or connected to a data transmission system, e.g. to a bus, wherein the first control device and the second control device and the third control device are configured such that at least one control device determined among them has the respective key code of the other two control devices transmitted to it by the latter, and wherein the at least one determined control device is configured to use prescribed criteria to detect whether its key code matches the key codes of the other two control devices that have been transmitted to it.

A common feature of all the aspects of the invention is the solution concept that the control devices to a certain extent transmit or possibly interchange key codes and use prescribed criteria to evaluate or check whether or not the key codes match, and that only matching key codes, that is to say only a matching combination of control devices, result in particular functions required for operation of the electric bicycle being enabled. For this purpose, the control devices can communicate via a common data transmission system, which may be implemented by means of a bus system, for example. In this case, the invention makes use of the fact that a pedelec frequently has three controllers: a drive unit, a battery or storage battery (energy store) and a display/operator control unit. These controllers or control devices associated therewith, which may be configured by means of hardware and/or software, can communicate e.g. via a data bus. The invention allows the components to operate only in a combination of respective matching key codes. Consequently, it is not worth stealing individual components, such as e.g. a storage battery, because this storage battery e.g. would not work with another display/operator control unit that has a nonmatching key code. A display/operator control unit on handlebars of the electric bicycle is frequently removable. If the rider takes the display/operator control unit with him after the ride, the result is likewise a simple anti-theft system for the whole bicycle. The subject matter of the first independent claim proceeds from at least two control devices, a first of which is coupled to the electric motor and a second of which is coupled to the energy store. These control units can transmit their key code to one another either unilaterally or reciprocally. The or each of the control unit(s) receiving a key code can check whether the key codes match. In this way, enabling dependent on this condition can be realised between the motor controller and the battery or the energy store, even without a display/operator control unit being provided or involved in the theft prevention.

The subject matter of second independent claim furthermore also includes a display/operator control unit and a third control device coupled thereto. The basic idea is that all the components involved in the theft prevention, including the energy store, can transmit key codes among one another to a stipulated extent, in particular can reciprocally interchange said key codes among one another. The invention allows at least one or more or all of the components involved (that is to say in particular electric motor and energy store and possibly display/operator control unit) to work only if the key codes match. This effectively prevents the theft of components (particularly of the expensive battery). Besides theft prevention for individual components, the removal of e.g. one component (e.g. the battery or the display/operator control unit) additionally results in theft prevention for the rest of the components or for the whole electric bicycle.

Electronic theft prevention renders stolen bicycles worthless. The theft prevention can be integrated into existing components easily and without added weight. The theft prevention is convenient for the bicycle rider.

The respective key codes could also be referred to as identification codes or as enable codes. Preferably, the respective control devices are configured to store key codes interchangeably. This affords the possibility that the components or control devices involved in the theft prevention are able to be trained to one another by authorised workshops using available diagnosis interfaces by virtue of matching key codes being stored in the control devices. The respective control devices can have e.g. a chip, a microcontroller, software or the like. Depending on the function, they can have suitable means for storing, sending, receiving data and/or means for signal processing, in particular for detecting key codes. Depending on the design, the control devices could also be referred to as controllers or as part of controllers. The prescribed criteria for checking whether key codes match may be implemented in the control devices e.g. as hardware and/or software.

There are numerous further possibilities for preferred development:

It is thus possible e.g. for the first control device, depending on the design, also to be suitable for controlling and/or regulating the electric motor and/or to be connected to a separate motor controller or regulator suitable for this purpose.

There is the possibility that only one of the control devices is intended to compare the key codes with one another. For example, the control device intended for that purpose may be the first or the second or the third control device. Alternatively, there is the possibility that multiple control devices involved in the theft prevention are intended to compare the respective key codes with one another. If e.g. only two control devices communicate with one another by means of the data transmission system, there is the possibility, for example, that each control device (that is to say the first control device and the second control device) has the key code of the respective other control device transmitted to it by the latter, each control device being configured to use prescribed criteria to detect whether its key code matches the key code of the other control device that has been transmitted to it. If three control devices communicate with one another by means of the data transmission system, there is the possibility, for example, that each control device (i.e. the first control device, the second control device and the third control device) has the key code of the respective other two control devices transmitted to it by the latter, each control device being configured to use prescribed criteria to detect whether its key code matches the key codes of the other control devices that have been transmitted to it. This in particular affords the possibility of dispensing with a separate locking mechanism for the energy store and/or with a separate locking mechanism for a display/operator control unit.

There is the possibility that the first control device is configured to generate a control signal that contains information regarding whether its key code matches the key code transmitted to it or the key codes transmitted to it, and to transmit the control signal either to a master control device or for control purposes, in particular for switching on or off, to the electric motor. Alternatively or in combination, there is the possibility that the second control device is configured to generate a control signal that contains information regarding whether its key code matches the key code transmitted to it or the key codes transmitted to it, and to transmit the control signal either to a master control device or for control purposes, in particular for switching on or off, to the energy store. If the electric bicycle has a third control unit, there is alternatively or in combination the possibility that the third control device is configured to generate a control signal that contains information regarding whether its key code matches the key code transmitted to it or the key codes transmitted to it, and to transmit the control signal either to a master control device or for control purposes, in particular for switching on or off, to the display/operator control unit.

It is regarded as expedient that the master control device is configured to detect whether a control signal transmitted to it contains information or whether all the control signals transmitted to it contain respective information that all the key codes match, and only in this case to prompt clearance for the electric motor and/or for the energy store and/or for the display/operator control unit for the operation of the electric bicycle. There is in particular the possibility that the master control unit is the first or the second or the third control device or is a control device separate from the first, second and third control devices. There is the possibility that the master control device is configured to detect whether a control signal transmitted to it contains information or whether all the control signals transmitted to it contain respective information that all the key codes match, and otherwise to prompt the first control device to cause a braking torque in the electric motor and/or to prompt a warning signal generation device of the electric bicycle, which in particular contains a light source, a sound source, a radio source or the like, to transmit a warning signal. If an unauthorised use is detected, the master control device, which may be e.g. with the display/operator control unit in a common housing, can e.g. prompt the electric motor to prevent riding with a counter-/braking torque. Alternatively or in combination, an illegal use can be indicated by means of an audible signal.

Effective theft prevention can be achieved in that the first control device and the electric motor are arranged in a housing that is common to them and/or in that the second control device and the energy store are arranged in a housing that is common to them and in particular detachably mounted on the frame of the electric bicycle, and/or in that the third control device and the display/operator control unit are arranged in a housing that is common to them and in particular detachably mounted on the frame or the handlebars of the electric bicycle.

It is regarded as expedient that the electric bicycle has a data interface that is connected or connectable to the data transmission system and that is configured to either read or store key codes from or in control devices. This facilitates what is known as "training" of the components or control devices of the electric bicycle that are involved in the theft prevention to one another. It is also regarded as expedient that the electric bicycle has a power supply system that is able to be selectively switched on and off for the first control device, the second control device and in particular for the third control device.

The invention moreover also relates to a method for operating an electric bicycle. Proceeding from the prior art described, the invention is in this respect based on the object of improving such a method with a view to theft prevention.

To achieve said object, the invention proposes that the method has the method steps of:
  providing an electric bicycle as claimed in one or more of the preceding claims,
  using the control devices to check whether their key codes match.

Also in this respect, there are numerous possibilities for preferred development:

A preference is that before the check on whether the key codes match, the method comprises the method step of:
  connecting the second control device and/or the third control device to the data transmission system. There is the possibility that the method comprises the method step of:
  providing a data diagnosis appliance, connecting the data diagnosis appliance to the data interface and reading at least one key code from a memory device or from multiple memory devices,
and/or
  providing a data input appliance, connecting the data input appliance to the data interface and inputting at least one key code into a memory device or into multiple memory devices. These method steps could also be referred to as "training" the control devices to one another.

BRIEF DESCRIPTION OF THE DRAWINGS

The invention is described by way of example below with reference to the accompanying figures, which show preferred exemplary embodiments and in which.

DESCRIPTION OF THE EMBODIMENTS

Figure 1:
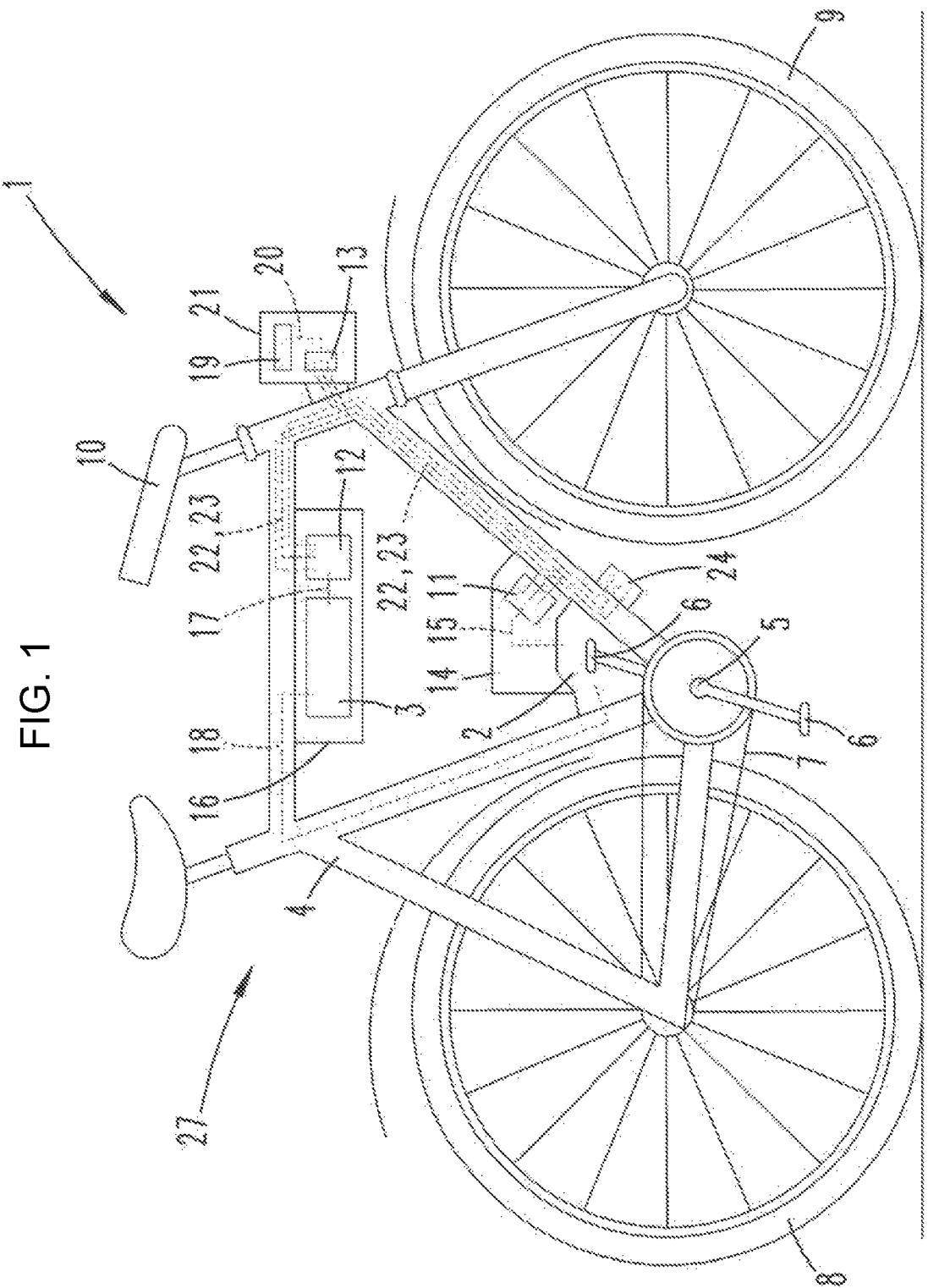
FIG. 1 shows a side view of an electric bicycle according to the invention based on a first exemplary embodiment.

FIG. 1 shows an electric bicycle 1 according to the invention based on a first exemplary embodiment. This is what is known as a pedelec. It comprises an electric motor 2 and an electrical energy store 3 for supplying electric power thereto. Said electrical energy store is rechargeable, i.e. configured as a storage battery. The electric bicycle 1 comprises a frame 4 on which a bottom bracket 5 having two pedals 6 mounted thereon is held. The bottom bracket 5 is connected to the rear wheel 8 by means of a chain 7 for driving purposes. The front wheel 9 is steerable by means of handlebars 10.

The electric bicycle 1 in the example comprises a first control device 11, a second control device 12 and a third control device 13. The first control device 11 is arranged with the electric motor 2 in a common housing 14 and connected to the electric motor 2 or possibly to a separate motor controller by means of a schematically shown electrical connection 15. As a result, the first control device 11 is permanently coupled to the electric motor 2. The housing 14 in the example is permanently mounted on the frame 4, the electric motor 2 transmitting torque to the bottom bracket 5 during operation. The first control device 11 comprises a microchip that is suitable for storing a first key code.

The second control device 12 is arranged together with the energy store 3 in a housing 16 common to them and is connected to the energy store 3 by means of an electrical connection 17. The energy store 3 is for its part also connected to the electric motor 2 by means of an electrical connection 18 for power supply purposes. The housing 16 in the example is removably mounted on the frame 4 (in a manner not depicted in more detail). The second control device 12 is permanently coupled to the energy store 3 by means of the housing 16 and the connection 17, so that these components can only be removed from or secured to the frame 4 together. The second control device 12 comprises a microcontroller that is suitable for storing a second key code.

The electric bicycle 1 in the example comprises a display/operator control unit 19. This is connected to the third control device 13 by means of an electrical connection 20 and is located with said third control device in a common housing 21 that is detachably (in a manner not shown in more detail) secured to the frame 4, but could also be, by way of example, detachably secured to the handlebars 10 instead. The third control device 13 contains a microcontroller that is suitable for storing a third key code. Since the third control device 13 and the display/operator control unit 19 are coupled electrically and mechanically, they can only be removed from or mounted on the frame 4 together in their housing 21.

The electric bicycle 1 comprises a data transmission system 22 that is realised by means of a bus 23 in the example. The first control device 11 is connected to the data transmission system 22 permanently. The housings 16 and 21 have connections (not shown in more detail in the figures), so that when the housings 16, 21 are on the frame 4 the control devices 12 and 13 are also connected to the data transmission system 22. In this state, the control devices 11, 12 and 13 can be activated by means of a central power supply, not shown in the figures. The control devices 11, 12 and 13 in the examples are customised by means of hardware and software such that each control device 11, 12, 13, after activation (that is to say after switching on), transmits its own key code, which preferably includes individual data, to each of the other two control devices 11, 12, 13 by means of the bus 23. This means that each control device 11, 12, 13 receives a key code from each of the other two control devices 11, 12, 13. The control devices 11, 12, 13 are customised to use respective signal processing means (these may be implemented by means of hardware and/or software) to use prescribed criteria to check whether their own key code matches the two received key codes.

The exemplary embodiment has provision for the first control device 11 to generate a first control signal if it establishes that the three key codes match. The first control signal may be a voltage impulse, for example, that is generated only if the three key codes match. The control signal therefore contains the information that the three key codes match. The first control device transmits its first control signal to the electric motor 2 or possibly to a controller upstream thereof, as a result of which the electric motor 2 goes on standby. If the first control signal does not appear, the electric motor 2 or the controller thereof is set such that it produces a torque counter to a direction of rotation of the pedals 6 in order to prevent theft of the electric bicycle 1.

The second control device 12 is configured such that it uses the electrical connection 17 to deliver a second control signal (for example a voltage impulse) to the energy store 3 or a controller upstream thereof if it establishes that the three key codes match. The voltage impulse produces the standby state of the energy store 3, i.e. without a corresponding voltage impulse the electrical energy store 3 delivers no power.

The third control device 13 is customised to transmit a third control signal to the display/operator control unit 19 by means of the electrical connection 20 if it establishes that the three key codes match. Only the third control signal puts the display/operator control unit 19 on standby.

The electric bicycle 1 has a data interface 24. This is connected to the data transmission system 22. This allows a data diagnosis appliance (not shown in the figures) to read or display key codes from the control devices 11, 12, 13. Similarly, this allows a data input appliance that can be connected to the interface to store key codes in the control devices 11, 12, 13 as required.

From the preceding description, it becomes clear that an immobiliser, denoted as a whole by the reference symbol 27 in FIG. 1, of the electric bicycle 1 comprises the control devices 11, 12, 13, the electric motor 2, the energy store 3, the display/operator control unit 19 and the data transmission system 22 and also a data interface 24.

Figure 2:
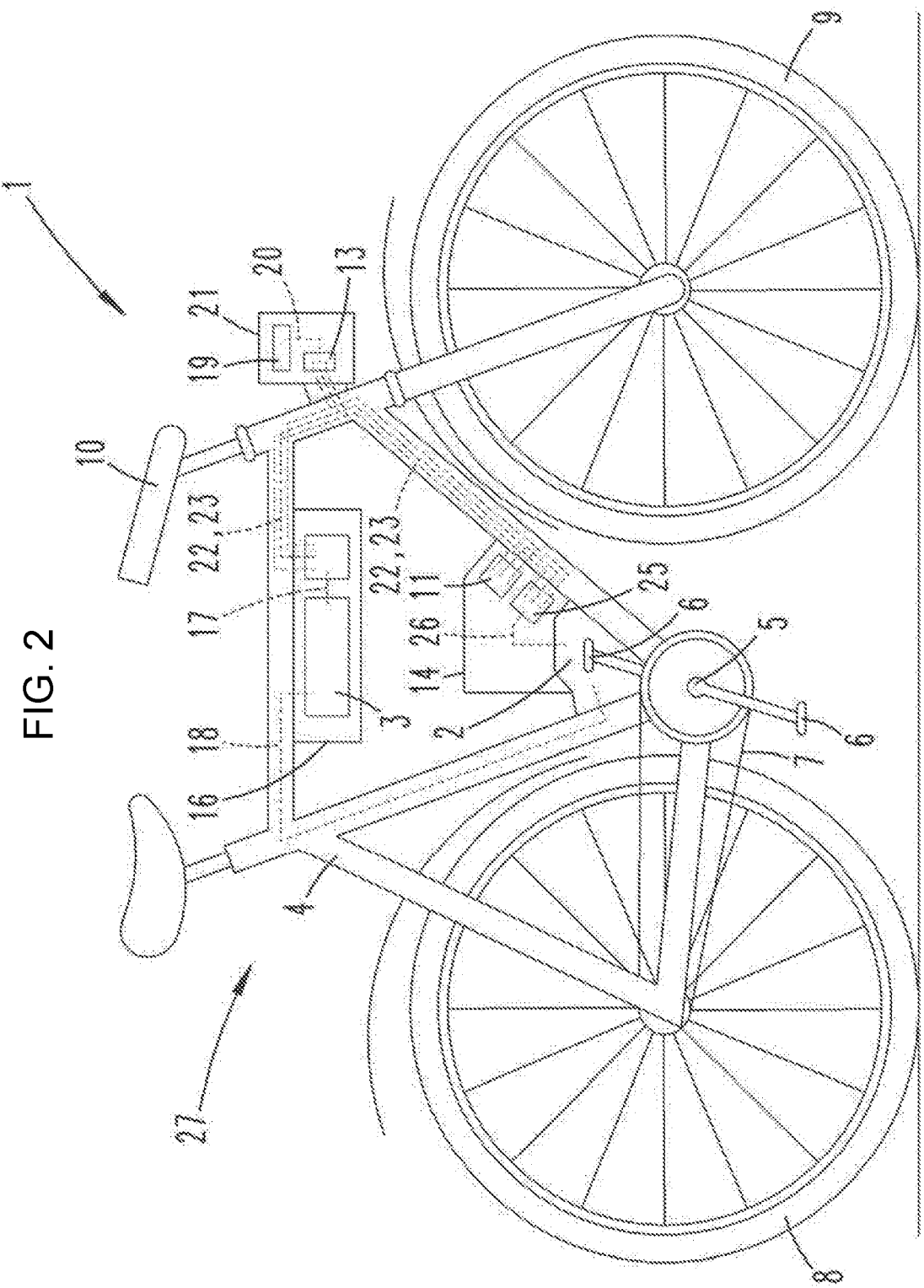
FIG. 2 shows an electric bicycle according to the invention based on a second exemplary embodiment.

FIG. 2 depicts an electric bicycle 1 according to the invention based on a second exemplary embodiment. In this case, features that are the same as or correspond to the first exemplary embodiment are provided with the same reference symbols. In addition to the first exemplary embodiment, the electric bicycle 1 shown in FIG. 2 comprises a master control device 25 that in the example (that is to say not necessarily) is arranged in the housing 14 as well. Alternatively, there would be e.g. the possibility of the master control device being in the housing 16 or in the housing 21 as well, and as a result being removable from the frame 4. The master control device 25 is likewise connected to the data transmission system 22.

In the second exemplary embodiment, the three control devices 11, 12, 13 are customised to transmit their respective control signal to the master control device 25 by means of the data transmission system 22. The master control device 25 is for its part customised to detect whether it gets a control signal containing information that all the key codes match transmitted to it by each of the three control devices 11, 12, 13. Only in that case does the master control device 25 for its part generate a master control signal that it transmits to the electric motor 2 or possibly a separate motor controller by means of an electrical connection 26 for clearance purposes. There would also be the possibility of the master control device 25 sending a master control signal to the energy store 3 and/or to the display/operator control unit 19 by means of the data transmission system for clearance purposes, i.e. to bring about a standby state, in order to put said energy store and/or display/operator control unit on standby only in this way.

It becomes clear from this that the immobiliser 27 of the electric bicycle 1 shown in FIG. 2 additionally comprises a master control device 25 in comparison with the immobiliser 27 shown in FIG. 1.

All the disclosed features are essential to the invention (on their own, but also in combination with one another). The subclaims with their features characterise independent inventive developments of the prior art, in particular in order to carry out divisional applications on the basis of these claims.

LIST OF REFERENCE SYMBOLS

1 Electric bicycle
2 Electric motor
3 Energy store
4 Frame
5 Bottom bracket
6 Pedals
7 Chain
8 Rear wheel
9 Front wheel
10 Handlebars
11 First control device
12 Second control device
13 Third control device
14 Housing
15 Electrical connection
16 Housing
17 Electrical connection
18 Electrical connection
19 Display/operator control unit
20 Electrical connection
21 Housing
22 Data transmission system
23 Bus
24 Data interface
25 Master control device
26 Electrical connection

The invention claimed is:

1. An electric bicycle, comprising:
an electric motor;
an electrical energy store for supplying power to said electric motor;
a display and operator control unit;
control devices each having a key code and including a first control device coupled to said electric motor and configured to store a first key code, a second control device coupled to said electrical energy store and configured to store a second key code and a third control device coupled to said display and operator control unit and configured to store a third key code, said control devices configured to be inoperable when said display and operator control unit is removed;
a data transmission system connected to said first, second and third control devices; and
said first, second and third control devices configured such that at least one of said first, second and third control devices functions as a determined control device having the key code of the other two of said control devices transmitted to said determined control device by said other two control devices, said determined control device being configured to use prescribed criteria to detect whether said key code of said determined control device matches the key code of each of said other two control devices that have been transmitted to said determined control device.

2. The electric bicycle according to claim 1, wherein said determined control device is one of said first control device, said second control device or said third control device.

3. The electric bicycle according to claim 1, wherein each respective one of said control devices is configured to use prescribed criteria to detect whether said key code stored therein matches key codes of two others of said other control devices that have been transmitted to said respective one of said control devices.

4. The electric bicycle according to claim 1,
further comprising a master control device; and
wherein said first control device is configured to generate a control signal that contains information regarding whether the first key code matches key codes transmitted to said first control device, and to transmit the control signal either to said master control device or for control purposes to said electric motor.

5. The electric bicycle according to claim 4, wherein said master control device is configured to detect whether the control signal transmitted to said master control device contains information that all the key codes match, and otherwise to prompt said first control device to cause a braking torque in said electric motor and/or to prompt a warning signal generation device of the electric bicycle to transmit a warning signal.

6. The electric bicycle according to claim 1,
further comprising a master control device; and
wherein said second control device is configured to generate a control signal that contains information regarding whether said key code of said second control device matches key codes transmitted to said second control device, and to transmit the control signal to said master control device.

7. The electric bicycle according to claim 1,
further comprising a master control device; and
wherein said third control device is configured to generate a control signal that contains information regarding whether the key code of said third control device matches the key code transmitted to said third control device or key codes transmitted to said third control device, and to transmit the control signal either to said master control device or for control purposes to said display and operator control unit.

8. The electric bicycle according to claim 7, wherein said master control device is configured to detect whether the control signal transmitted to said master control device contains information containing respective information that all the key codes match, and only then prompts clearance for said electric motor and/or for said electrical energy store and/or for said display and operator control unit for operation of the electric bicycle.

9. The electric bicycle according to claim 1, further comprising:
- a first housing housing said first control device and said electric motor;
- a second housing housing said second control device and said electrical energy store; and
- a third housing housing said third control device and said display and operator control unit.

10. The electric bicycle according to claim 1, further comprising a data interface that is connectable to said data transmission system and is configured to either read or store key codes from or in said control devices.

11. The electric bicycle according to claim 1, further comprising a power supply system that is able to be selectively switched on and off for said first control device, said second control device and said third control device.

12. A method for operating an electric bicycle, which comprises the method steps of:
- providing an electric bicycle including:
  - an electric motor;
  - an electrical energy store for supplying power to the electric motor;
  - a display and operator control unit;
  - control devices each configured to store a key code and including a first control device coupled to the electric motor and configured to store a first key code, a second control device coupled to the electrical energy store and configured to store a second key code and a third control device coupled to the display and operator control unit and configured to store a third key code, the control devices configured to be inoperable when the display and operator control unit is removed; and
- a data transmission system connected to the first, second and third control devices, the first, second and third control devices configured such that at least one of the first and second and third control devices functions as a determined control device which has the key code of the other two of the control devices transmitted to the determined control device by the other two control devices, the determined control device configured to use prescribed criteria to detect whether said key code of the determined control device matches the key code of said other two control devices that have been transmitted to said determined control device; and
- using the control devices to check whether key codes match.

13. The method according to claim 12, which further comprises performing the following steps before performing the check on whether the key codes match:
- connecting the second control device to the data transmission system.

14. The method according to claim 12, which further comprises:
- providing a data diagnosis appliance;
- connecting the data diagnosis appliance to a data interface;
- reading at least one said key code from a memory device;
- providing a data input appliance;
- connecting the data input appliance to the data interface; and
- inputting at least one said key code into the memory device.

15. The method according to claim 12, which further comprises: configuring each respective one of the control devices to use prescribed criteria to detect whether the key code stored therein matches key codes of two others of the other control devices that have been transmitted to the respective one of the control devices.

* * * * *